(12) United States Patent
Curello et al.

(10) Patent No.: US 8,235,077 B2
(45) Date of Patent: Aug. 7, 2012

(54) DEVICE FOR REFILLING A FUEL CARTRIDGE FOR A FUEL CELL

(75) Inventors: Andrew J. Curello, Hamden, CT (US);
Floyd Fairbanks, Naugatuck, CT (US);
Michael Curello, Cheshire, CT (US);
David Gray, Milford, CT (US)

(73) Assignee: Societe Bic, Clichy Cedex (FR)

(*) Notice: Subject to any disclaimer, the term of this patent is extended or adjusted under 35 U.S.C. 154(b) by 1019 days.

(21) Appl. No.: 11/531,816

(22) Filed: Sep. 14, 2006

(65) Prior Publication Data

US 2010/0028748 A1 Feb. 4, 2010

(51) Int. Cl.
*B65B 1/04* (2006.01)

(52) U.S. Cl. ......... 141/347; 141/346; 141/348; 141/349

(58) Field of Classification Search .......... 141/346–351; 429/12, 13, 34, 400; 137/613, 614.04; 285/319
See application file for complete search history.

(56) References Cited

U.S. PATENT DOCUMENTS

| | | | | |
|---|---|---|---|---|
| 3,104,088 A | * | 9/1963 | Cator | 251/149.6 |
| 3,143,440 A | | 8/1964 | Hunger | |
| 3,404,061 A | | 10/1968 | Shane | |
| 4,114,853 A | * | 9/1978 | Medvick | 251/149.6 |
| 4,261,956 A | | 4/1981 | Adlhart | |
| 4,390,603 A | | 6/1983 | Kawana | |
| 5,002,254 A | * | 3/1991 | Belisaire et al. | 251/149.9 |
| 5,074,524 A | * | 12/1991 | Wade | 251/149.6 |
| 5,544,858 A | * | 8/1996 | Rogers et al. | 251/149.6 |
| 5,634,505 A | * | 6/1997 | Wong | 141/349 |
| 5,945,231 A | | 8/1999 | Narayanan | |
| 5,992,008 A | | 11/1999 | Kindler | |
| 6,015,209 A | * | 1/2000 | Barinaga et al. | 347/86 |
| 6,161,579 A | * | 12/2000 | Vulliet | 137/614.05 |
| 6,326,097 B1 | | 12/2001 | Hockaday | |
| 6,447,022 B1 | * | 9/2002 | Allen | 285/305 |
| 6,488,320 B1 | * | 12/2002 | Anderson | 285/319 |
| 6,506,513 B1 | * | 1/2003 | Yonetsu et al. | 429/34 |
| 6,554,877 B2 | | 4/2003 | Finklelshtain | |
| 6,562,497 B2 | | 5/2003 | Finkelshtain | |
| 6,713,201 B2 | * | 3/2004 | Bullock et al. | 429/462 |
| 6,722,628 B1 | * | 4/2004 | Seil | 251/129.15 |
| 6,758,871 B2 | | 7/2004 | Finkelshtain | |
| 6,773,470 B2 | | 8/2004 | Finkelshtain | |
| 6,786,254 B1 | * | 9/2004 | Kralick | 141/287 |
| 6,924,054 B2 | * | 8/2005 | Prasad et al. | 429/416 |
| 7,059,582 B2 | * | 6/2006 | Adams et al. | 251/144 |
| 7,093,623 B2 | * | 8/2006 | Soucy | 141/2 |
| 7,128,106 B2 | * | 10/2006 | Becerra et al. | 141/349 |
| 7,172,825 B2 | * | 2/2007 | Adams et al. | 429/12 |
| 7,270,907 B2 | * | 9/2007 | Becerra et al. | 429/34 |
| 7,537,024 B2 | * | 5/2009 | Adams et al. | 137/614.04 |
| 7,543,611 B2 | * | 6/2009 | Kallberg | 141/1 |

(Continued)

*Primary Examiner* — Timothy L Maust

(74) *Attorney, Agent, or Firm* — The H.T. Than Law Group

(57) ABSTRACT

A refillable fuel supply assembly for a fuel cell is disclosed herein. The assembly includes a refillable fuel supply adapted to supply fuel to a fuel cell, a refilling fuel cartridge containing fuel to be transferred to the refillable fuel supply, and a lock-and-release device connecting the refilling fuel cartridge to the refillable fuel supply to transport fuel from the refilling fuel cartridge to the refillable fuel supply. The lock-and-release device also retains the refilling fuel cartridge to the refillable fuel supply until the refilling fuel cartridge is substantially free of fuel.

15 Claims, 5 Drawing Sheets

U.S. PATENT DOCUMENTS

| | | |
|---|---|---|
| 7,622,207 B2 * | 11/2009 | Kaye .............................. 429/13 |
| 7,712,794 B2 * | 5/2010 | Yang et al. .................... 285/316 |
| 2002/0076602 A1 | 6/2002 | Finkelshtain |
| 2003/0077493 A1 | 4/2003 | Colborn |
| 2003/0082416 A1 * | 5/2003 | Bullock et al. ................. 429/12 |
| 2003/0096150 A1 | 5/2003 | Rice |
| 2003/0215688 A1 * | 11/2003 | Yang et al. ..................... 429/34 |
| 2004/0209142 A1 | 10/2004 | Becerra |
| 2004/0265652 A1 | 12/2004 | Soucy |
| 2005/0022883 A1 | 2/2005 | Adams |
| 2005/0023236 A1 | 2/2005 | Adams |
| 2006/0050261 A1 | 3/2006 | Brotsack |
| 2007/0077480 A1 * | 4/2007 | Curello et al. ................. 429/34 |

* cited by examiner

DEVICE FOR REFILLING A FUEL CARTRIDGE FOR A FUEL CELL

BACKGROUND

The invention relates generally to fuel cartridges for fuel cells. In particular, the invention relates to refillable fuel supplies.

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g. methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell and also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-Reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 3,143,440; 4,390,603; 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In a chemical metal hydride fuel cell, sodium borohydride is reformed and reacts as follows:

$$NaBH_4 + 2H_2O \rightarrow (\text{heat or catalyst}) \rightarrow 4(H_2) + (NaBO_2)$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference in its entirety.

Fuel cartridges may contain many re-usable parts, such as valves. Some of the parts require specific alignment, for example, separable valves which only open when two or more valve parts are correctly connected to each other. As such, obtaining proper alignment may be difficult or time-consuming for a consumer. Refilling of fuel cartridges is one way to keep these re-usable parts. However, since the fuels for fuel cells may be liquid, there remains a need for a device to assist the consumers in refilling the cartridge.

SUMMARY OF THE INVENTION

An aspect of the present invention is related to a refillable fuel supply assembly for a fuel cell. The refilling assembly comprises a refillable fuel supply adapted to supply fuel to a fuel cell, a refilling fuel cartridge containing fuel to be transferred to the refillable fuel supply, and a lock-and release device connecting the refilling fuel cartridge to the refillable fuel supply to transport fuel from the refilling fuel cartridge to the refillable fuel supply. The lock-and-release device also retains the refilling fuel cartridge to the refillable fuel supply until the refilling fuel cartridge is substantially free of fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
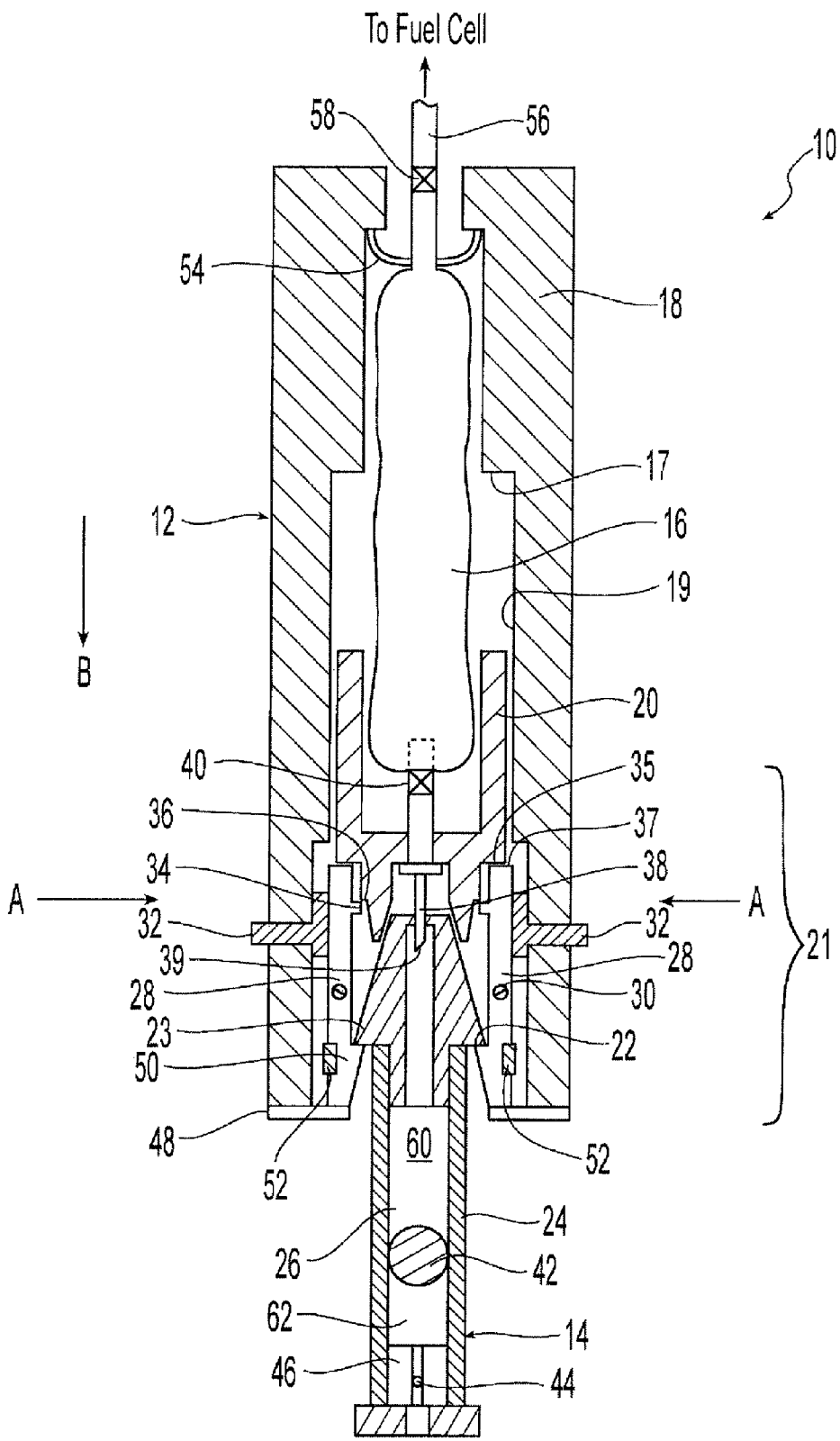
FIG. 1 is a cross-sectional view of a refillable fuel cartridge assembly including a refillable fuel cartridge and a refilling assembly according to one embodiment of the present invention.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or alcohols, metal hydrides, such as sodium borohydride, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid-borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a blend or mixture of methanol, sodium borohydride, an electrolyte and other compounds, such as those described in U.S. Pat. Nos. 6,554,877; 6,562,497 and 6,758,871, which are incorporated herein by reference in their entireties. Fuels also include those that are partially dissolved in solvent and partially suspended in solvent, described in U.S. Pat. No. 6,773,470 and those that include both liquid fuel and solid fuels, described in United States published patent application no. 2002/076602. These references are also incorporated herein by reference in their entireties. Fuels also include hydrogen.

Fuels also include a metal hydride such as sodium borohydride ($NaBH_4$) and water, discussed above, and the low pressure, low temperature produced by such reaction. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gases, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist (December 2001/January 2002), at pp. 20-25. As used in the present application, the term "fuel cell" also includes microengines. Other applications include storing traditional fuels for internal combustion engines, and hydrocarbons, such as butane for pocket and utility lighters and liquid propane.

As shown in FIG. 1, a refillable fuel assembly 10 is shown. Refillable fuel assembly 10 includes a fuel cartridge 12 and a refilling cartridge 14. Fuel cartridge 12 and refilling cartridge 14 are sized and dimensioned so that refilling cartridge 14 may be removably inserted into fuel cartridge 12 and securely held therewithin until the fuel is depleted. In other words, the entire refillable fuel assembly 10 is used with a device or fuel cell, and refilling cartridge 14 is exchanged when necessary, much like changing the batteries on an electronic device.

Fuel cartridge 12 is similar to other fuel cartridges known in the art, for example those fuel cartridges discussed in U.S. patent application no. US2005/0023236, which is incorporated herein in its entirety by reference. Fuel cartridge 12 may be part of a fuel cell or a device powered by the fuel cell (not shown) or separate therefrom. Fuel cartridge 12 includes a housing 18, preferably made of a rigid material, such as metal, plastic, or the like. For example, housing 18 may be made from a material similar to that of the housing of the fuel cell (not shown) or the device the fuel cell powers (not shown). Housing 18 is preferably removably attachable to the fuel cell or the device, although housing 18 may also be permanently affixed thereto. Housing 18 may have any shape known in the art, such as box-like, cylindrical, or the like. Housing 18 includes a cover 48 configured with an opening to allow refilling cartridge 14 to be inserted into housing 18. Cover 48 may be movable or slidable relative to housing 18 to allow refilling cartridge 14 to be inserted.

Housing 18 defines an inner chamber 19 within which resides an inner liner or bladder 16 operatively associated with a lock-and-release mechanism 21. Chamber 19 may also have stop 17, which limits the distance lock-and-release mechanism 21 may travel within chamber 19. Bladder 16 is an inflatable, refillable bladder capable of containing fuel for the fuel cell (not shown) and deforming, such as by shrinking, as the fuel is removed for use by the fuel cell. Similar bladders are discussed in US2005/0023236. Bladder 16 is preferably sized so that it substantially fills inner chamber 19 when bladder 16 is substantially full. Bladder 16 is preferably thin-walled and made from a durable and flexible material so that it efficiently collapses or reduces its volume, as fuel is withdrawn. Bladder 16 may also contain ribs, such as those discussed in US2005/0023236, to help transport the fuel. Bladder 16 is preferably made of a material substantially inert to the fuel. Preferred materials for bladder 16 include natural rubber, polyethylene (including low density to high density PE), ethylene propylene (EP), EPDM and other thin polymeric films. Preferably the polyethylene is fluorinated and is substantially free of metal ions. The polyethylene can be laminated with a vapor barrier layer, such as aluminum foil, compressed exfoliated grapple foil (such as those described in U.S. Pat. No. 3,404,061) or fluorine treated plastics, to reduce methanol permeation. Suitable materials for housing 18, bladder 16 and refilling cartridge 14 are disclosed in U.S. Pat. No. 7,059,582, which is incorporated herein by reference in its entirety.

Bladder 16 can be made from multi-ply or multi-layer materials. The innermost layer is compatible with the fuel cell fuels, i.e., resistance to the fuel, and has low permeability. The middle layer is a barrier to fuel cell fuels or is impermeable. The outermost layer may be another barrier layer, and can be resistant to the fuel. In one example, the innermost layer can be fluorine treated polyethylene (LDPE or HDPE), the middle layer can be nylon or silicane and the outer layer can be an aluminum foil.

The multi-layer material may be co-extruded and pleated to make the liner. Edges of the liner can be sealed by heat generated by radio frequency, ultrasonic or heat sources. The liner can also be shrink-wrapped in aluminum foil. This prolongs the shelf life of the cartridge, since the innermost layer can withstand the fuel's corrosive effect and the middle and outer layers provide barriers to keep the fuel inside the liner and the outer layer prevents ultraviolet light from degrading the liner.

One end of bladder 16 is fluidly connected to a fuel conduit 56 for transferring fuel from bladder 16 to the fuel cell. Fuel conduit 56 is a tube or passage made from a material which is substantially inert to the fuel. For example, fuel conduit 56 may be made from the same material as bladder 16, a rigid material, or any other material known in the art. Fuel conduit 56 is sealingly attached to bladder 16 using any method known in the art, such as by welding, ultrasonic welding, or using a sealing adhesive such as epoxy. Alternatively, fuel conduit 56 may be co-molded with or integrally molded with bladder 16 such that fuel conduit 56 and bladder 16 form a unitary piece. An optional valve 58 is preferably included within or adjacent to fuel conduit 56 to control the flow of fuel out of bladder 16. Valve 58 may be any type of valve known in the art, such as a check valve, solenoid valve or a duckbill valve.

The opposite end of bladder 16 terminates in a needle hollow tube 38 configured to be inserted into refilling cartridge 14 when refilling cartridge 14 is properly introduced into housing 18. Needle 38 is a hollow tubular conduit that is fluidly and sealingly connected to bladder 16 and extends away from bladder 16 as shown in FIG. 1. Needle 38 may be configured with a piercing point 39 that is capable of puncturing a seal or frangible membrane 64 on refilling cartridge 14, discussed below. Preferably a unidirectional valve 40 such as a check valve, a duckbill valve or any similar valve known in the art is positioned within needle 38. Valve 40 is preferably oriented so that a fuel 60 may flow only into bladder 16 from refilling cartridge 14 and not backwash from bladder 16 into refilling cartridge 14.

It will be appreciated by those in the art that needle 38 may be alternately positioned on refilling cartridge 14. For example, bladder 16 may terminate near the insertion point of refilling cartridge 14 with one valve component of a separable valve, such as those valves discussed in U.S. patent application publication no. 2005/0022883 and international patent publication no. WO 2006/050261, which are incorporated herein in their entireties by reference thereto. The other half of a separable valve would then be positioned on needle 38. As refilling cartridge 14 is inserted into housing 18, the two halves of the separable valve join to form a flow path so that fuel can be transferred from refilling cartridge 14 to bladder 16.

Refilling cartridge 14 includes an assembly housing 24, which defines a fuel chamber 26 and a driving chamber 46. Assembly housing 24 may be made from any material known in the art, such as the material(s) of housing 18. Preferably, assembly housing 24 is made from a material substantially inert to a fuel 60 disposed within fuel chamber 26 or is lined or coated with such a substantially inert material. Fuel 60 is preferably a liquid fuel such as methanol, but may also be other types of fuels. Fuel 60 can optionally be pressured to aid the transfer of fuel from refilling cartridge 14 into bladder 16.

Figures 2, 3, 4:
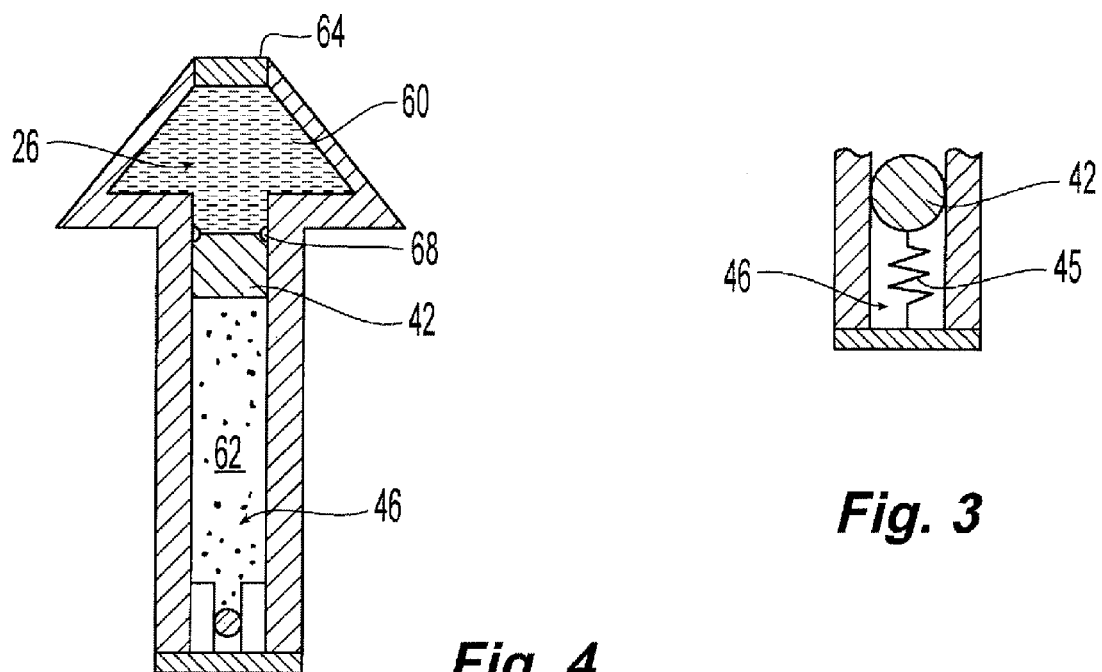
FIG. 2 is a cross-sectional view of an alternate refilling assembly for the refillable fuel cartridge assembly shown in FIG. 1.
FIG. 3 is a partial cross-sectional view of an alternate driving mechanism for the refilling assembly shown in FIG. 2.
FIG. 4 is a cross-sectional view of another alternate refilling assembly for the refillable fuel cartridge assembly shown in FIG. 1.

An assembly head 23 is affixed to one end of assembly housing 24. Assembly head 23 is made from a similar or the same rigid material as that of assembly housing 24, and assembly head 23 may be attached thereto using any means known in the art, such as overmolding, welding, or affixing with an adhesive. In another embodiment, such as shown in FIG. 2, assembly head 23 and assembly housing 24 form a unitary piece. Assembly head 23 is configured such that a shoulder 22 extends outward from assembly housing 24, shown forming the tapered shape of assembly head 23. Shoulder 22 forms a part of lock-and-release mechanism 21, discussed in greater detail below. Frangible membrane 64, such as a metal, plastic, or composite foil, is preferably sealingly affixed to assembly head 23 as shown in FIG. 2. Frangible membrane 64 seals fuel 60 within fuel chamber 26 while allowing for access to fuel 60, such as when punctured by needle 38 or peeled off prior to the insertion of refillable assembly 14 into housing 18.

Driving chamber 46 contains a propellant 62, such as butane, of compressed air/gas or a carbonated solution, to expel fuel from refilling cartridge 14 as depicted in FIGS. 2 and 4. Alternatively, driving chamber 46 may include a spring 45 retaining stored energy, such as a compressed helical spring or any other type of spring known in the art, as shown in FIG. 3.

Driving chamber 46 is sealingly separated from fuel chamber 26 by a piston 42. Preferably, piston 42 is a ball made of an elastomeric material which is substantially inert to both fuel 60 and propellant 62. Piston 42 is sized to seal fuel chamber 26 but also slide therewithin when driven to do so by propellant 62. Alternatively, piston 42 can be replaced by a viscous slug of gel that seals fuel chamber 26 and moves with the fuel, or by an expandable stationary bellow that expands and replaces the volume of transported fuel. However, as shown in FIG. 4, piston 42 may have other configurations, such as square or rectangular, with sealing members 68 to prevent fuel 60 and propellant 62 from mixing. Spring 45 or propellant 62 is balanced by the seal of frangible membrane 64 until fuel 60 is given a release path, such as through needle 38 after frangible membrane 64 has been broken, as shown in FIG. 4. Once fuel 60 is given a release path, spring 45 or propellant 62 expands, thereby releasing its stored energy and pushing piston 42 away from driving chamber 46. Fuel 60 is forced out of refilling cartridge 14 and into fuel cartridge 12 in this manner by piston 42. It will be recognized by those in the art that the volumes of driving chamber 46 and fuel chamber 26 change as fuel 60 is expelled; the volume of driving chamber 46 increases while the volume of fuel chamber 26 decreases by the re-positioning of piston 42.

If propellant 62 is used, preferably driving chamber 46 includes a variable volume mechanism 44. Variable volume mechanism 44 allows for propellant to be exposed to a wide range of environmental conditions without being triggered to expel fuel 60 from refilling cartridge 14. For example, variable volume mechanism 44 may be a small piston 72 slidingly disposed in a channel 73. If propellant 62 is heated, propellant 62 may expand into channel 73 by moving piston 72, shown in FIG. 2. As such, propellant 62 does not expand or attempt to expand into fuel chamber 26 by moving piston 42. In another example, variable volume mechanism 44 can include an expandable elastic bladder or an expandable pleated bellow.

Referring to FIG. 1, lock-and-release mechanism 21 is positioned adjacent to bladder 16 and to needle 38, and is preferably configured to retain refilling cartridge 14 securely within housing 18 until bladder 16 is substantially emptied or is emptied. Lock-and-release mechanism 21 includes a carriage 20 attached to bladder 16, hinged clamps 28 and release pins 32. Hinged clamps 28 are positioned to be in contact with carriage 20 and are configured to retain refilling cartridge 14 within housing 18. Release pins 32 are disposed within housing 18 and are positioned to be in contact with hinged clamps 28, such that by depressing release pins 32 hinged clamps 28 are pivoted.

Clamps 28 are hingedly attached to housing 18 of fuel cartridge 12 by pins 30. Clamps 28 may be made from any type of rigid material known in the art capable of being machined or molded into specific configurations, for example metals such as steel, titanium, and aluminum, plastics, resins, and the like. Each clamp 28 preferably has two stops: a stop 34 and a hook 50 located at opposite ends of hinged clamp 28. A tie 52 surrounds the ends of clamps 28 near hook 50. Tie 52 holds clamps 28 in position to retain refilling cartridge 14 within housing 18 of fuel cartridge 12. Preferably, tie 52 is made of an elastomeric material such as a rubber band so that hinged clamps 28 may be pivoted about pins 30 to release empty refilling cartridge 14 but will automatically return to the configuration for retaining the next refilling cartridge 14. In other words, tie 52 biases hinged clamps 28 to a position for retaining refilling cartridge 14. Accordingly, assembly head 23 is tapered and includes angled walls to form a wedge to pivot and separate clamps 28 during insertion so that shoulder 22 of refilling cartridge 14 may be fully inserted into housing 18 of fuel cartridge 12 and shoulders 22 are retained by hooks 50 of hinged clamps 28.

Stop 34 is an extension of clamps 28 disposed close to carriage 20 and close to end 35 of clamps 28. Carriage 20 is a rigid guide fixedly attached to one end of bladder 16, such as by overmolding, welding, or with an adhesive such as epoxy. Carriage 20 is slidably movable within inner chamber 19, so that when bladder 16 is at least partially filled, carriage 20 is translated toward refilling cartridge 14 and when bladder 16 is substantially empty, carriage 20 is translated away from refilling cartridge 14 by the deflation of bladder 16. A spring 54 provides additional force urging bladder 16 and carriage 20, toward refilling cartridge 14.

Carriage 20 includes stop surfaces 36 and 37 configured to engage with stop 34 and end 35 of hinged clamps 28, respectively, when carriage 20 is translated toward refilling cartridge 14. As such, flange 35 abuts a portion of carriage 20 so that release pins 32 cannot be depressed along arrow A to release refilling cartridge 14 from housing 18 when bladder 16 is at least partially full.

Carriage 20 also includes a hole disposed at or near the center thereof so that needle 38 may pass through carriage 20 to access refilling cartridge 14. Needle 38 is fixedly attached to carriage 20 and bladder 16 as shown in FIG. 1. As such, needle 38 transfers the motion of bladder 16 as it empties to carriage 20.

Figure 5:
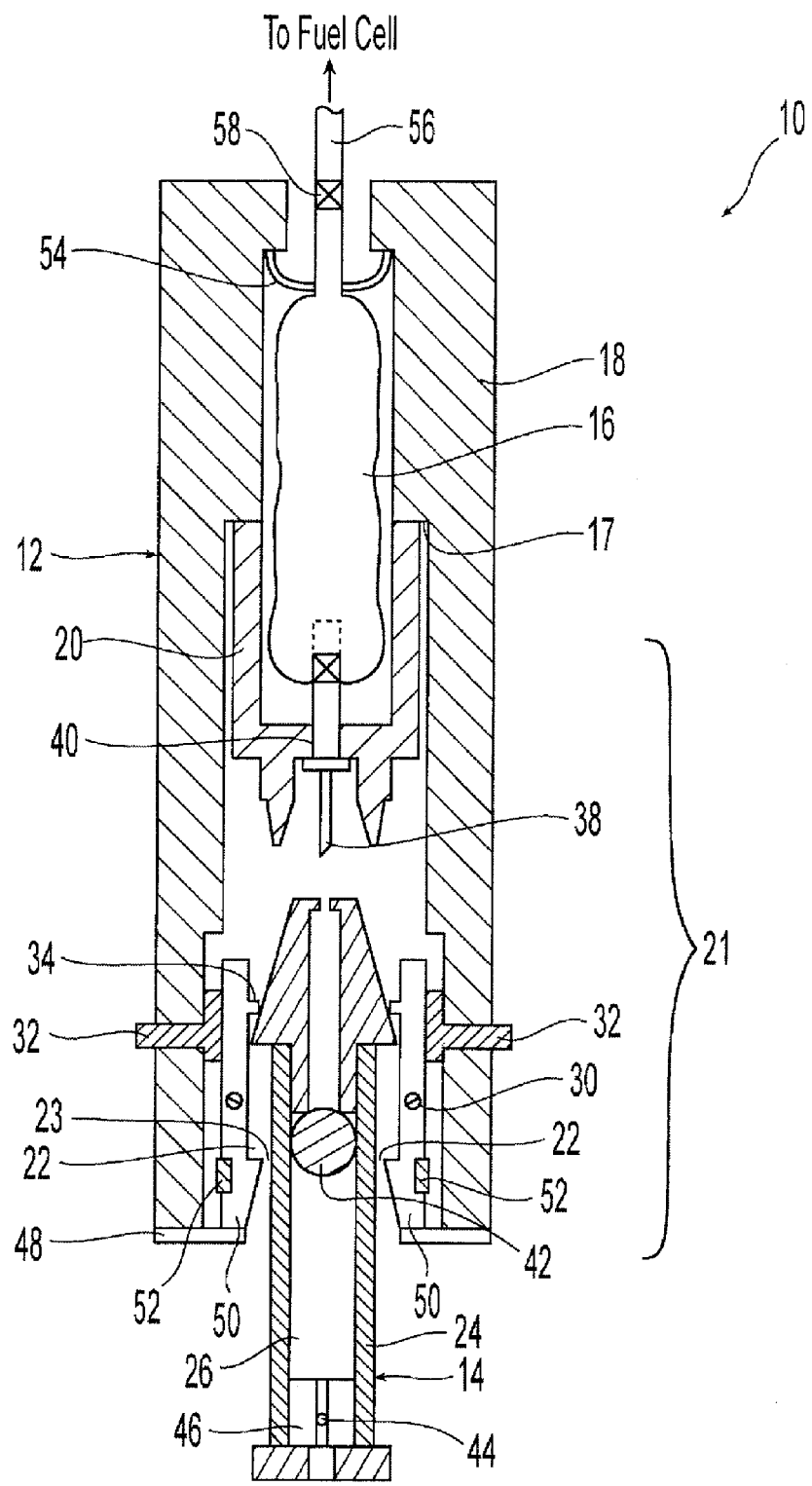
FIG. 5 is a cross-sectional view of the refillable fuel cartridge of FIG. 1 with the fuel being substantially expelled from the refilling cartridge.

When the fuel from bladder 16 is transported to the fuel cell, bladder 16 would deflate and lose its volume, as shown in FIG. 5. When bladder 16 deflates and shrinks due to the elasticity of its material or due to its reduced volume, it pulls carriage 20 away from hinged clamps 28. Tapered assembly head 23 can move along with carriage 20 due to the contacts between tapered assembly head 23 and carriage 20 and between needle 38 and membrane 64, until shoulder 22 of tapered assembly head 23 comes into contact with stops 34, as shown. Tapered head assembly 23 is then separated from carriage 20, and is loosely held between hinged clamps 28. In this configuration, hinged clamps 28 are free to pivot when release pins 32 are pushed in direction A. At this point, refilling cartridge 14 is preferably emptied, having already transferred all its fuel 60 to bladder 16 and some of the transferred fuel already has been transported to the fuel cell. After hinged clamps 28 are pivoted, hooks 50 are disengaged from shoulders 22 of refilling cartridge 14 and empty cartridge 14 can be separated from fuel cartridge 12.

Figure 6:
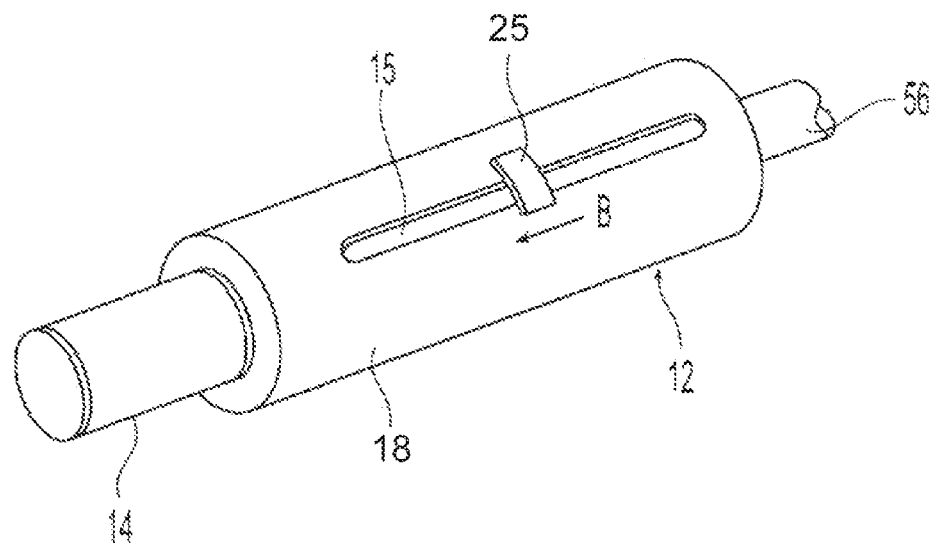
FIG. 6 is an isometric view of the embodiment of FIG. 1.

When release pins 32 are released, tie 52 returns hinged clamp 28 to its normal position and a new refilling cartridge may be inserted, when necessary. To insert a new refilling cartridge, release pins 32 can be depressed along arrow A, or the new refilling cartridge may be directly inserted without depressing release pins 32 due to the shape of tapered assembly head 23 and hooks 50. New refilling cartridge 14 is then retained in position by hooks 50 and shoulders 22 with frangible member 56 intact. Empty or partially empty bladder 16 is in a withdrawn state and the relative positions of bladder 16, carriage 20 and tapered assembly head 23 are substantially similar to those in FIG. 5. To expose fuel 60 from refilling cartridge 14 to bladder 16, carriage 20 is moved toward frangible member 64 along arrow B until needle 38 penetrates frangible member 64 and comes into contact with fuel 60. Preferably, carriage 20 is connected to lever 25, which is slidingly disposed within channel 15 defined on housing 14, as shown in FIG. 6. Lever 25 is movable along direction B, as shown, to move carriage 20 toward frangible member 64. Lever 25 can also function as a visual fuel gage, since its location is indicative of the volume of bladder 16.

Propellant 62 expands, pushing piston 42 toward assembly head 23, and forcing fuel 60 through valve 40, i.e., the additional force supplied by propellant 62 allows for valve 40 to be opened by creating a sufficient pressure differential across valve 40. Fuel 60 continues to flow into bladder 16 until bladder 16 is substantially filled. When bladder 16 is substantially filled, fuel chamber 26 of refilling cartridge 14 may not be empty. In this case, the pressure in bladder 16 would be substantially the same as the pressure within fuel chamber 26, and valve 40 can be selected to close when there is no significant pressure across it. Hence, when bladder 16 is sufficiently filled and fuel chamber 26 is not yet empty, valve 40 closes to keep fuel 60 inside refilling cartridge 14. As fuel is transported from bladder 16 to the fuel cell, the pressure in bladder 16 drops until its pressure is lower than the pressure in fuel chamber 26 to open valve 40 to continue the refilling process. In one example, valve 40 is a check valve that requires at least 1 psi of pressure to open, and preferably at least 2 psi to open. Preferably, needle 38 has sufficient length to maintain contact with fuel 60 until all of fuel 60 is transported to bladder 16.

Figure 7:
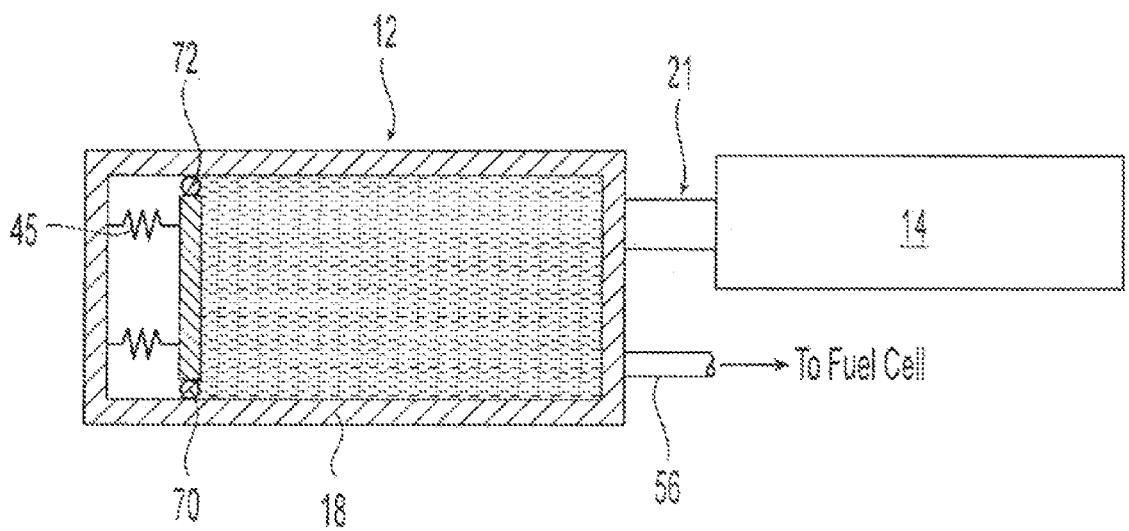
FIG. 7 is a partial cross-sectional view of another embodiment of the present invention.

Referring to FIG. 7, another embodiment is shown. In this embodiment, lock-and-release mechanism 21 and outlet fuel conduit 56 are located on the same side of fuel cartridge 12. Instead, fuel cartridge 12 is provided with a movable wall 70 slidingly disposed within housing 18 of fuel cartridge 12. Movable wall 70 also forms a seal with housing 18 by means of sealing member 72. Movable wall 70 is also biased by at least one energy storage member, such as spring 45 or a compressed gas or a liquefied hydrocarbon toward the direction of refilling cartridge 14. During refilling, fuel 60 from refilling cartridge 14 is pushed into cartridge 12 by driving member 44 through lock-and-release mechanism 21, as discussed above. Thereafter, when fuel is needed, energy storage member 45 pushes fuel out of fuel cartridge 12 to the fuel cell. Empty refilling cartridge 14 can be replaced as discussed above.

It will be apparent to those skilled in the art that release pins 32 may be depressed manually by a user or automatically by a mechanism on the device or fuel cell (not shown). The mechanism on the device is preferably controlled by a system connected to a sensor, such as a fuel gauge such as those described in U.S. patent application publication no. 2005/0115312, which is incorporated herein in its entirety by reference thereto. When bladder 16 is empty, the sensor sends a signal to the mechanism to activate release pins 32.

Figure 8:
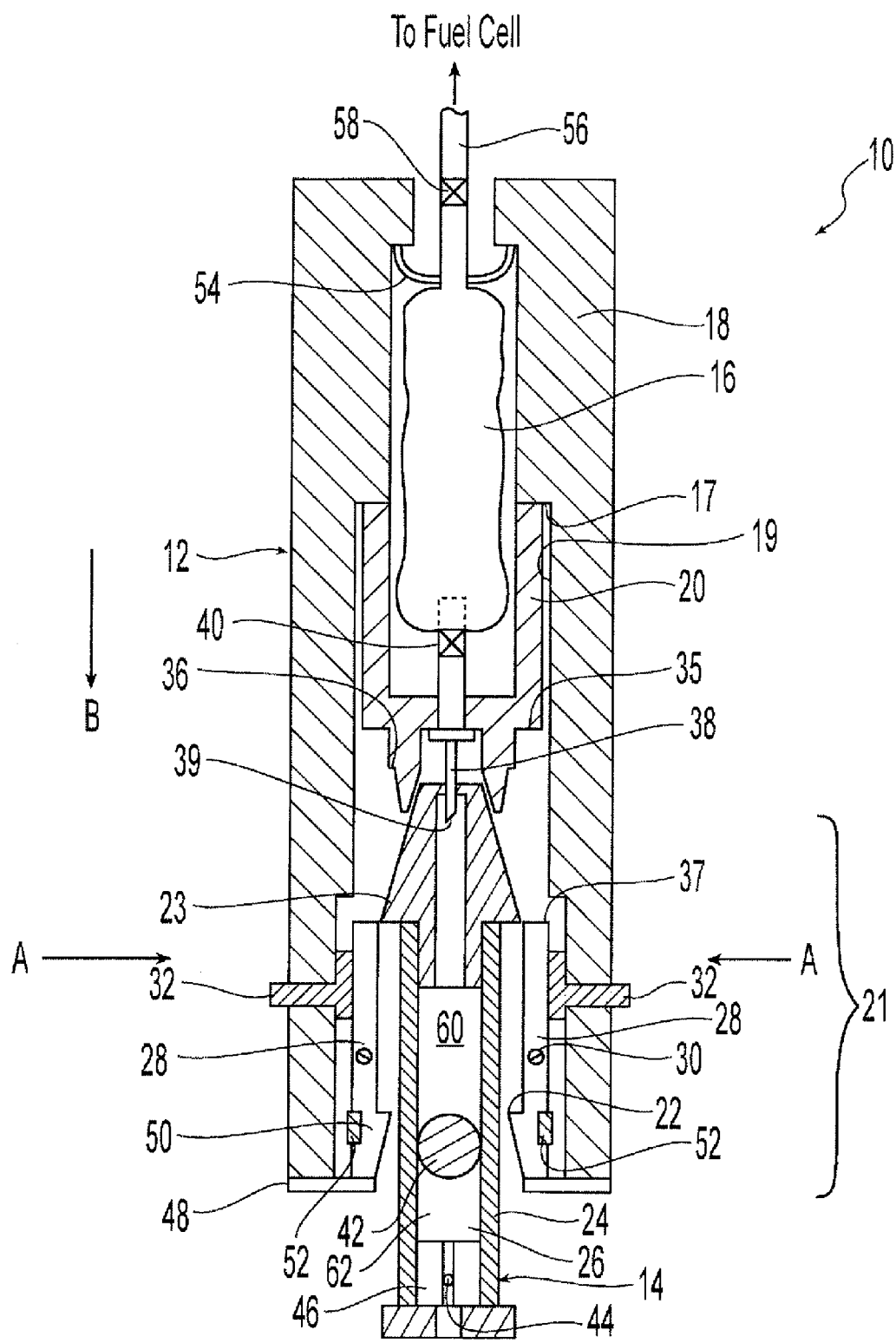
FIG. 8 is a cross-sectional view of a variation of the embodiment shown in FIGS. 1-6.

Referring to FIG. 8, a variation of the embodiment shown in FIGS. 1-6 is shown. In this embodiment, stops 34 on hinged clamps 28 are omitted. When bladder 16 deflates and shrinks, it again moves away from hinged clamps 28. Carriage 20 moves along with bladder 16 and pulls tapered assembly head 23 and refilling cartridge 14 with it. Without stops 34, refilling cartridge 14 does not separate from carriage 20 and bladder 16, and is being pulled into chamber 19 of housing 18. To remove empty refilling cartridge 14, a user first manually pulls cartridge 14 away from carriage 20, then presses release pins 32 to move hinged clamps 28 to remove tapered assembly head 23 from the hinged clamps. To insert a new refilling cartridge 14, the user would insert it through hinged clamps 28 and continue to insert it into chamber 19. Since bladder 16 is at least partially empty, it cannot resist the insertion of new cartridge 14. When carriage 20 comes into contact with stops 17, the movement of carriage 20 and bladder 16 stops, and the tapered assembly head 23 of new cartridge 14 can engage carriage 20, so that needle 38 can pierce membrane 64 and new fuel 60 can be transported into bladder 16. As bladder 16 is filled, it expands and pushes carriage 20 and new cartridge 14 outward to a configuration similar to that of FIG. 1. In this embodiment, lever 21 and channel 15 are not necessary and can be omitted.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention. All publications discussed herein, including but not limited to patents, patent applications, articles, and books, are incorporated by reference in their entireties.

We claim:

1. A refillable fuel supply assembly for a fuel cell comprising:
   a refillable fuel supply adapted to supply fuel to a fuel cell,
   a refilling fuel cartridge containing fuel to be transferred to the refillable fuel supply, wherein the refillable fuel supply comprises a fuel bladder containing fuel transferred from the refilling fuel cartridge, and
   a lock-and-release device connecting the refilling fuel cartridge to the refillable fuel supply to transport fuel from the refilling fuel cartridge to the refillable fuel supply said lock-and-release device comprises a release member, a movable carriage connected to the fuel bladder, and a releasing clamp connecting a portion of the refilling fuel cartridge to the refillable fuel supply.

2. The refillable fuel supply assembly of claim 1, wherein the release member comprises a release pin operatively connected to the releasing clamp.

3. The refillable fuel supply assembly of claim 2, wherein when the refilling fuel cartridge contains a substantial amount of residual fuel, the movable carriage is disposed in a first location that blocks the release pin from acting on the releasing clamp to allow the refilling fuel cartridge to be disconnected from the refillable fuel supply.

4. The refillable fuel supply assembly of claim 3, wherein when the refilling fuel cartridge is substantially free of fuel, the movable carriage is movable to a second position that allows the release pin to act on the releasing clamp to allow the refilling fuel cartridge to be disconnected from the refillable fuel supply.

5. The refillable fuel supply assembly of claim 1, wherein said releasing clamp is pivotally connected to a housing of the refillable fuel supply.

6. The refillable fuel supply assembly of claim 1, wherein the refilling fuel cartridge is pressurized.

7. The refillable fuel supply assembly of claim 6, wherein the refilling fuel cartridge is pressurized by a spring, compressed gas or liquefied hydrocarbon.

8. The refillable fuel supply assembly of claim 1, wherein the fuel bladder is elastic.

9. The refillable fuel supply assembly of claim 1, wherein a fuel flow path is established between the refilling fuel cartridge and the refillable fuel supply and said fuel flow path comprises a valve that opens when the pressure in the refilling fuel cartridge is greater than the pressure of the refillable fuel supply.

10. The refillable fuel supply assembly of claim 9, wherein the valve opens when the pressure in the refilling fuel cartridge is greater than the pressure of the refillable fuel supply by a predetermined amount.

11. The refillable fuel supply assembly of claim 1, wherein the refillable fuel supply comprises a fuel chamber adapted to receive fuel from the refilling fuel cartridge and said chamber is pressurized at a first pressure.

12. The refillable fuel supply assembly of claim 11, wherein the refilling fuel cartridge is pressured at a second pressure, wherein the second pressure is higher than the first pressure.

13. A refillable fuel supply assembly for a fuel cell comprising:
   a refillable fuel supply adapted to supply fuel to a fuel cell,
   a refilling fuel cartridge containing fuel to be transferred to the refillable fuel supply, and
   a lock-and-release device connecting the refilling fuel cartridge to the refillable fuel supply to transport fuel from the refilling fuel cartridge to the refillable fuel supply and retaining the refilling fuel cartridge to the refillable fuel supply until the refilling fuel cartridge is substantially free of fuel, wherein the refilling fuel cartridge is pressurized and further comprises a variable volume device to absorb at least a portion of the pressure.

14. A refillable fuel supply assembly for a fuel cell comprising:
- a refillable fuel supply adapted to supply fuel to a fuel cell,
- a refilling fuel cartridge containing fuel to be transferred to the refillable fuel supply, and
- a lock-and-release device connecting the refilling fuel cartridge to the refillable fuel supply to transport fuel from the refilling fuel cartridge to the refillable fuel supply and retaining the refilling fuel cartridge to the refillable fuel supply until the refilling fuel cartridge is substantially free of fuel, wherein when the refilling fuel cartridge contains a substantial amount of residual fuel, the movable carriage is disposed in a first location that blocks the release pin from acting on the releasing clamp to allow the refilling fuel cartridge to be disconnected from the refillable fuel supply, and wherein when fuel is transported from the fuel bladder, the fuel bladder's volume is reduced and the movable carriage is moved away from the first position.

15. A refillable fuel supply assembly for a fuel cell comprising:
- a refillable fuel supply adapted to supply fuel to a fuel cell,
- a refilling fuel cartridge containing fuel to be transferred to the refillable fuel supply, and
- a lock-and-release device connecting the refilling fuel cartridge to the refillable fuel supply to transport fuel from the refilling fuel cartridge to the refillable fuel supply and retaining the refilling fuel cartridge to the refillable fuel supply until the refilling fuel cartridge is substantially free of fuel, wherein when the refilling fuel cartridge contains a substantial amount of residual fuel, the movable carriage is disposed in a first location that blocks the release pin from acting on the releasing clamp to allow the refilling fuel cartridge to be disconnected from the refillable fuel supply, wherein when the refilling fuel cartridge is substantially free of fuel, the movable carriage is movable to a second position that allows the release pin to act on the releasing clamp to allow the refilling fuel cartridge to be disconnected from the refillable fuel supply, and, wherein the movable carriage is movable from the second position to the first position to establish a flow path between the refillable fuel supply and an unopened refilling fuel cartridge.

\* \* \* \* \*